United States Patent Office 3,451,061
Patented June 17, 1969

3,451,061
FUNCTIONAL FLUID COMPOSITIONS
Edward S. Blake and William C. Hammann, Dayton, Ohio, assignors to Monsanto Company, St. Louis, Mo., a corporation of Delaware
No Drawing. Filed Oct. 13, 1958, Ser. No. 766,685
Int. Cl. C07c 41/04, 43/20; C10m 1/20
U.S. Cl. 260—613          7 Claims This invention relates to a limited novel class of unsubstituted aromatic ethers which are particularly suitable as functional fluids for use at extremely high temperatures of the order of about 800° F. and higher. More particularly this invention relates to the series of meta-linked unsubstituted aromatic polyethers, i.e., the poly(m-oxyphenylene)benzenes, containing at least four benzene rings in the polyether chain and to their use as functional fluids.

The present critical requirements for high-temperature functional fluids are extremely restrictive. Thus, the functional fluid may be required as a synthetic lubricant for jet engines, as a hydraulic fluid for supersonic aircraft and missiles, as coolants for electronic equipment, etc., wherein the fluid is often required to function at extreme temperature ranges up to 800° F. and higher and down to normal atmospheric temperatures. These requirements pose the very difficult problem of finding suitable compositions which are thermally stable at the very high temperatures, but are still fluid at the lower temperatures. The fluids must also possess adequate temperature-viscosity properties and suitable lubricity, i.e., the fluids must not get too thin at the very high temperatures and/or too thick at the lower temperatures, and must possess adequate lubricating characteristics over the range of temperatures to which the system is subjected.

Various lower aromatic polyethers generally containing three benzene rings have long been known in the prior art. Thus various polyaryl polyethers disclosed by Ullmann and Sponagel, Annalen 350, 83–107 (1906) are:

| Compound: | Melting point, ° F. |
|---|---|
| 1. o-Bisphenoxybenzene | 199 |
| 2. m-Bisphenoxybenzene | 143 |
| 3. p-Bisphenoxybenzene | 165 |
| 4. p-Bis(o-toloxy)benzene | 124 |
| 5. p-Bis(m-toloxy)benzene | 135 |
| 6. p-Bis(p-toloxy)benzene | 216 |
| 7. Bis(p-phenoxyphenyl) ether | 232 |
| 8. 1,3,5-triphenoxybenzene | 234 |

Staudinger and Staiger, Annalen 517, 67–72 (1935) also disclosed a series of para-linked aromatic polyethers including Items 3 and 7, above, and the higher polyethers containing 5 and 6 benzene rings:

| Compound: | Melting point, ° F. |
|---|---|
| 9. p-Bis(p-phenoxyphenoxy)benzene | 304 |
| 10. Bis[p-(p-phenoxyphenoxy)phenyl] ether | 343 |

It will be readily apparent that the various prior art polyethers are not suitable functional fluids for use over extreme temperature ranges due to their relatively high melting points. The aforesaid polyether compositions can be obtained by the Ullmann (supra) ether synthesis which broadly relates to ether-forming reactions of, e.g., alkali metal phenoxides such as sodium and potassium phenoxides with aromatic halides such as bromobenzene in the presence of a copper catalyst such as metallic copper, copper hydroxides, or copper salts.

The principal object of the instant invention is to prepare a functional fluid composition which has high thermal stability at temperatures of the order of about 800° F. and higher. Another object of the instant invention is to provide a functional fluid composition which can be maintained in a fluid state at from about normal atmospheric temperatures to very high temperatures of the order of about 800° F. and higher. Still another object of the instant invention is to provide a functional fluid composition which possesses good temperature-viscosity and lubricity characteristics, has a high oxidation resistance, high radiation stability, low vapor pressure, and is substantially free from corrosive action. Other objects and advantages of this invention will be apparent to those skilled in the art from the following disclosure.

It has now been found that a limited class of meta-linked unsubstituted polyaromatic polyethers containing at least four benzene rings in the polyether chain possess the desired properties to satisfy the above-listed objects. This novel class of functional fluid compositions can be illustrated by the structural formula

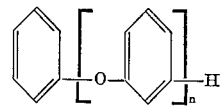

wherein $n$ is an integer of at least 3 and preferably is an integer from 3 to 6 inclusive, i.e., the series of meta-linked unsubstituted polyethers containing from 4 to 7 benzene rings therein, respectively illustrated by the compounds:

bis(m-phenoxyphenyl) ether
m-bis(m-phenoxyphenoxy)benzene
bis[m-(m-phenoxyphenoxy)phenyl] ether
m-bis[m-(m-phenoxyphenoxy)phenoxy]benzene It also will be understood that mixtures of the aforesaid class of meta-linked polyethers can be employed as functional fluids and that for various less critical applications compositions comprising at least about 50 weight percent and preferably about 90 weight percent of the instant polyethers can be formulated with the various compatible prior art functional fluids. It will be understood that minor amounts of various additives such as viscosity-index improvers, antioxidants, pour-point depressants, dyes, and the like, can be employed with these compositions, especially when other functional fluids are employed with the poly(m-oxyphenylene)benzene compositions of the instant invention.

The instant meta-linked polyester compositions are accordingly superior functional fluids which are useful as hydraulic fluids, lubricants, heat-transfer fluids, and the like particularly under high temperature conditions of the order of about 800° F. and higher. These polyether compositions are also useful as heat-transfer fluids in atomic plants and are particularly suitable in naval use where any leakage, spills, etc., aboard ship could be readily flushed into the waste system and the functional fluid would sink rather than leave a slick on the surface of the water.

Other compositions having relatively high thermal stability have been suggested, but these compositions generally also have a relatively high melting point whereby their use presents the problem of maintaining the system at a sufficiently high temperature to maintain the composition in a fluid state. Accordingly, their use for example in a special hydraulic system would present the danger of plugging by local freezing in the system whereby the system would fail if not maintained at elevated temperatures. However, the present poly(m-oxyphenylene)benzene compositions containing at least 3 oxyphenylene units do not crystallize at low temperatures, but rather form a glass whereby there is no heat of fusion to overcome in the event that the said compositions were to solidify. Thus, the present compositions have the additional advantage of being relatively easily fluidified should they become solidified at low temperatures. In contradistinction thereto a far greater heat input is required to fluidify the prior art crystalline materials.

From the foregoing it is apparent that the instant compositions are unexpectedly endowed with a combination of properties which make them eminently suitable for the disclosed uses. Thus, the combination of extreme high thermal stability coupled with the fact that these compositions are still fluid at normal atmospheric temperatures and, if permitted to solidify at relatively low temperatures, their non-crystalline structure permits more efficient fluidification, makes the instant compositions unique in the field of high temperature functional fluids.

The thermal decomposition points were determined by the isotenisocopic method, wherein the decomposition point is the temperature at which the rate of decomposition in a half-filled glass vessel and oxygen-free atmosphere is sufficient to cause an isothermal rate of pressure rise of 0.014 mm. of mercury per second, as measured in an isotenisocopic apparatus of the type described by Smith and Menzies, J. Amer. Chem. Soc. 32, 897, 907, 1412 (1910).

One of the most widely employed commercial functional fluids intended as having high thermal stability is di(2-ethylhexyl)sebacate and this compound has a thermal stability or thermal decomposition point of 525° F,. which will be noted to be about 300° F. below the thermal decomposition points of the poly (m-oxyphenylene)benzene compounds of the instant invention. Whereas this is a very substantial numerical difference this difference is far greater than apparent from the comparison of the thermal decomposition points since the practical use of the functional fluids in service is greatly extended even by relatively small differences in thermal decomposition points. Thus in determining the useful life of the functional fluid at about 600° F., i.e., the time in hours at about 600° F. for 10 percent of the functional fluid to decompose, it is found that the di(2-ethylhexyl)sebacate has a useful life of about 10 hours, whereas the compounds of the instant invention have a useful life of the order of about $6 \times 10^6$ hours.

The following examples are illustrative of the instant invention.

EXAMPLE 1

A mixture of 55.7 g. (0.3 mole) of m-phenoxyphenol, 15.7 g. (0.28 mole) of potassium hydroxide, and 50 ml. of xylene was heated at reflux under a a nitrogen atmosphere until 6 ml. of water had been collected in a Dean and Stark trap. The xylene remaining in the reaction mixture was distilled therefrom and 60 g. (0.24 mole) of m-bromophenyl phenyl ether and 1 g. of copper powder were introduced into the reaction vessel. Then the reaction mixture was heated at 240°–250° C. overnight. The reaction mixture was poured into 500 ml. of a 5 percent aqueous potassium hydroxide solution and extracted with four 250-ml. portions of benzene. The combined benzene extract was then washed with two 250-ml. portions of 5 percent potassium hydroxide solution and then with three 250-ml. portions of water, dried over anhydrous soduim sulfate, filtered, and the benzene removed by distillation up to 150° C. at 15 mm. mercury to obtain 92 g. of a dark red oil. The reaction products were then distilled through an 11-inch Vigreux column to obtain an 86 percent yield of crude product, the bulk of which distilled at 222° to 224° C. at 1 mm. of mercury. This fraction was taken up in 100 ml. of benzene, treated with 5 g. of charcoal, filtered through Attapulgus earth and then through alumina to obtain a colorless solution. The benzene was removed by distillation up to 170° C. at 15 mm. of mercury pressure and the residue distilled through an 11-inch Vigreux column to recover 61 g. of product identified as bis(m-phenoxyphenyl) ether. This product had a distillation range of 214° to 217° C. at 0.7 mm. of mercury, a boiling point of about 860° F., a refractive index of about $n_D^{25}$ 1.6195, a thermal decomposition point of 813° F., and was still fluid down to about 22° F.

Analysis.—Calculated for $C_{24}H_{18}O_3$: C, 81.34%; H, 5.12%. Found: C, 81.18%; H, 5.20%.

EXAMPLE 2

A mixture of 87.5 g. (0.47 mole) of m-phenoxyphenol and 24.6 g. (0.44 mole) of potassium hydroxide was introduced into a reaction vessel and heated until reaction occurred over the temperature range of about 80° to 110° C. Then 40 ml. of toluene was introduced and the reaction mixture refluxed until 10 ml. of water had been collected in a Dean and Stark trap. The toluene was then distilled from the reaction mixture while maintaining the reaction mixture above about 135° to 140° C. to avoid the precipitation of the potassium m-phenoxyphenoxide. Thereafter 50 g. (0.21 mole) of m-dibromobenzene and 1 g. of copper powder were added to the reaction mixture and after the initial reaction the mixture was held at 220° to 230° C. for 4 hours with stirring, then cooled to 80° C. and 150 ml. of benzene added thereto. The reaction mixture was poured into 200 ml. of water, the organic phase recovered and filtered, diluted to about 300 ml. benzene and washed with five 100-ml. portions of 5 percent aqueous sodium hydroxide solution, dried with anhydrous calcium chloride, filtered, and the benzene distilled therefrom at a temperature up to 120° C. at 15 mm. mercury to obtain 86 g. of a dark red oil. The oil reaction products were then distilled through an 11-inch Vigreux column and the fraction having a distillation range of about 280° C. to 294° C. at 2.5 mm. mercury recovered. This fraction was taken up in 200 ml. of benzene, treated with 5 g. of charcoal, filtered, and then passed through alumina to obtain a substantially colorless solution. The benzene was stripped off and the residue distilled through an 11-inch Vigreux column to recover the product identified as m-bis(m-phenoxyphenoxy)benzene. This product had a boiling point of 292° to 294° C. at 2.5 mm. of mercury, a refractive index of about $n_D^{25}$ 1.6304, a thermal decomposition point of 848° F., and was still fluid down to about 44° F.

Analysis.—Calculated for $C_{30}H_{22}O_4$: C, 80.70%; H, 4.97%. Found: C, 80.71%; H, 4.98%.

EXAMPLE 3

A mixture of 45.4 g. (0.18 mole) of m(m-phenoxyphenoxy)phenol, 0.16 mole of potassium hydroxide, and 35 ml. of toluene was heated at reflux until 3.5 ml. of water had been collected in a Dean and Stark trap. The toluene was then distilled from the reaction mixture at a temperature up to 210° C. and 40 g. (0.12 mole) of m-bromophenyl m-phenoxyphenyl ether and 1 g. of copper powder were introduced into the reaction vessel. The reaction mixture was heated at 230° to 250° C. for 4 hours with stirring then cooled and taken up in 150 ml. of benzene containing 50 ml. of water. The organic phase was separated from the aqueous phase, treated with anhydrous sodium sulfate, filtered, and the benzene removed by distillation up to 170° C. at 15 mm. mercury pressure. The recovered reaction mixture then was distilled through an 11-inch Vigreux column and the fraction having a distillation range of 280° to 295° C. at 0.15 mm. of mercury pressure separated from the balance of the reaction mixture. This fraction was taken up in 150 ml. of benzene, washed with four 100-ml. portions of 10 percent aqueous sodium hydroxide solution and two 100-ml. portions of water, dried over anhydrous sodium sulfate, filtered, treated with 5 g. charcoal, and passed through alumina to obtain a colorless solution. The solution was concentrated to a volume of about 100 ml., treated with 5 g. of Attapulgus earth, filtered through diatomaceous earth, and the benzene removed by distillation up to 300° C. at 15 mm. of mercury pressure. The colorless oil residue was distilled through an 11-inch Vigreux column to recover the product identified as bis[m-(m-phenoxyphenoxy)phenyl] ether. This product had a distillation range of 280° to 283° C. at 0.15 mm. of mercury pressure, a refractive index of about $n_D^{25}$ 1.6360, a thermal decomposition point of 842° F. and was still fluid down to about 57° F.

*Analysis.*—Calculated for $C_{36}H_{26}O_5$: C, 80.28%; H, 4.87%. Found: C, 80.51%; H, 5.12%.

EXAMPLE 4

In a similar fashion to the above examples 133 g. (0.48 mole) of m(m-phenoxyphenoxy)phenol and 26.3 g. (0.47 mole) of potassium hydroxide were heated together under a nitrogen atmosphere and after all of the phenolic compound was dissolved 35 ml. of toluene was added thereto and the reaction mixture refluxed until 11 ml. of water had been collected in a Dean and Stark trap. The toluene was distilled from the reaction mixture. Then 2 g. of copper powder was added to the reaction mixture, which was heated to about 230° C. and 54.3 g. (0.23 mole) of m-dibromobenzene added thereto over a 10-minute period. The reaction mixture was then stirred under the nitrogen atmosphere for 4 hours at a temperature of from about 230° to 250° C. Then 300 ml. of benzene was added to the cooled solution and the solution washed with 150 ml. of a 5 percent aqueous sodium hydroxide solution. The organic phase was separated and washed with three 100-ml. portions of dilute sodium hydroxide, then one 100-ml. portion of water, and filtered. The filtrate was heated with 5 g. of decolorizing charcoal, filtered, passed through alumina, and benzene stripped therefrom to obtain a yellowish oil residue. The oil residue composition was distilled through an 11-inch Vigreux column to obtain 74 g. of a fraction, the bulk of which had a distillation range of 320° to 325° C. at 0.15 mm. of mercury. This fraction was dissolved in 150 ml. of benzene, washed with two 100-ml. portions of a 10 percent sodium hydroxide solution, one 100-ml. portion of 5 percent sodium sulfate, dried over anhydrous sodium sulfate, filtered, passed through alumina, and the benzene stripped therefrom to give 72 g. of a light yellow oil. This oil was again distilled through an 11-inch Vigreux column and the fraction having a distillation range of 318° to 324° C. at 0.15 mm. mercury collected and identified as m-bis[m(m-phenoxyphenoxy)phenoxy]benzene. This product was found to have a refractive index of about $n_D^{25}$ 1.6407, a thermal decomposition point of 842° F., and was still fluid down to about 70° F.

*Analysis.*—Calculated for $C_{42}H_{30}O_6$: C, 79.98%; H, 4.80%. Found: C, 79.42%; H, 5.00%.

From the foregoing disclosure it will be seen that the various poly(m-oxyphenylene)benzene compositions and mixtures thereof can be prepared by the condensation of substantially mole equivalents of an alkali metal phenoxide and a halobenzene each of which may contain a m-phenoxy radical, or a plurality thereof, to provide a polyether having at least 4 benzene rings in the polyether chain. Similarly the alkali metal phenoxide can be reacted with a m-dihalobenzene compound in a mole ratio of about 2:1, which "m-dihalobenzene compound" would include the m-dihalo(m-oxyphenylene)benzenes illustrated by the formula

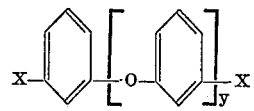

wherein X is a halogen atom, preferably bromine, and y is a positive integer; and a m-dialkali metal (m-oxyphenylene)phenoxide illustrated by the formula

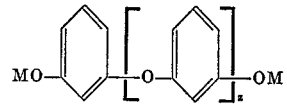

wherein M is an alkali metal, preferably potassium or sodium, and z is a positive integer, can be reacted with a halobenzene in a mole ratio of 1:2, to effect the formation of the instant poly(m-oxyphenylene)benzene compositions. Thus, one can readily select the reactants having substantially an equivalent total mole ratio of the reactive alkali metal and halo groups to prepare the desired poly(m-oxyphenylene)benzene compositions.

Accordingly, the aforesaid process can be broadly illustrated by the reaction

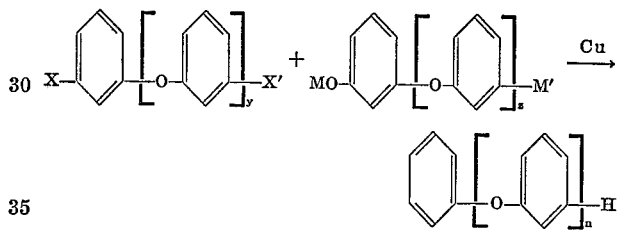

wherein X is a halogen atom, X' is selected from the group consisting of X and H, M is an alkali metal, M' is selected from the group consisting of —OM and H, at least one of the reactants is monofunctional, y and z are positive integers the sum of which is equal to $n-1$, and n is an integer of at least 3. The preferred alkali metal is potassium and the preferred halogen atom is bromine, which classes of reactants are illustrated in the foregoing manipulative examples.

The copper catalyst can be metallic copper, copper hydroxides, a copper salt, or mixtures thereof. Whereas the exact quantity of copper catalyst is not critical, amounts of the order of about 3 to 6 mole percent of copper, based on total mole equivalent of the halo groups, have been found satisfactory, however, larger and smaller amounts can be employed as desired. Also the reaction temperature can be varied over a range of from about 170° to about 280° C., but preferably is maintained at from about 220° C. to about 250° C.

We claim:
1. A meta-linked, unsubstituted poly(m-oxyphenylene)benzene defined by the structural formula

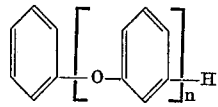

wherein n is an integer of at least 3 and mixtures of the aforesaid poly(m-oxyphenylene)benzenes.

2. A meta-linked, unsubstituted poly(m-oxyphenylene)benzene defined by the structural formula

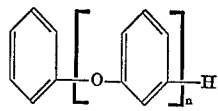

wherein n is an integer from 3 to 6, inclusive, and mixtures of the aforesaid poly(m-oxyphenylene)benzenes.

3. The meta-linked, unsubstituted poly(m-oxyphenylene)benzenes of claim 2, wherein $n$ is an integer from 3 to 4.
4. Bis(m-phenoxyphenyl) ether.
5. m-Bis(m-phenoxyphenoxy)benzene.
6. Bis[m-(m-phenoxyphenoxy)phenyl] ether.
7. m-Bis[m-(m-phenoxyphenoxy)phenoxy]benzene.

References Cited

UNITED STATES PATENTS

| | | | |
|---|---|---|---|
| 2,940,929 | 6/1960 | Diamond | 260—613 |
| 3,006,852 | 10/1961 | Barnum et al. | 260—613 XR |

OTHER REFERENCES

Gilman, Organic Chemistry, vol. II, 2nd ed. (1938), pp. 1727–32.

Murakami et al., Chem. Abstracts, vol. 45 (1951), p. 6598.

Ullmann et al., Annolen, vol. 350 (1906), pp. 84, 95–102.

Kotera, Chem. Ab., vol. 45 (1951), p. 6598.

Chemical & Engineering News, Aug. 4, 1958, p. 17.

BERNARD HELFIN, *Primary Examiner.*

U.S. Cl. X.R.

252—52, 67, 73